(12) United States Patent
Hodroj

(10) Patent No.: US 10,750,523 B1
(45) Date of Patent: Aug. 18, 2020

(54) SUPPLEMENTAL SCHEDULING SERVER

(71) Applicant: T-Mobile USA, Inc., Bellevue, WA (US)

(72) Inventor: Samir Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1 day.

(21) Appl. No.: 16/282,073

(22) Filed: Feb. 21, 2019

(51) Int. Cl.
*H04W 72/12* (2009.01)
*H04W 72/04* (2009.01)
*H04W 28/08* (2009.01)
*H04W 84/12* (2009.01)

(52) U.S. Cl.
CPC ....... *H04W 72/1263* (2013.01); *H04W 28/08* (2013.01); *H04W 72/044* (2013.01); *H04W 84/12* (2013.01)

(58) Field of Classification Search
None
See application file for complete search history.

(56) References Cited

U.S. PATENT DOCUMENTS

| 2005/0027840 A1* | 2/2005 | Theobold | H04W 28/00 709/223 |
| 2010/0165958 A1* | 7/2010 | Roy | H04W 48/20 370/338 |
| 2019/0124525 A1* | 4/2019 | Gacanin | H04L 43/08 |

* cited by examiner

*Primary Examiner* — Anh Ngoc M Nguyen
(74) *Attorney, Agent, or Firm* — Han Santos, PLLC

(57) ABSTRACT

Systems and methods for allowing multiple user devices to access a wireless local area network are disclosed. A user device receives supplemental scheduling information that is generated based on telemetry data collected from multiple access points of a data network. The user device requests an access point of the data network for accessing the wireless local area network according to a wireless usage type. The wireless usage type is determined based on an application running on the user device and the supplemental scheduling information. The user device receives an allocation of time-frequency divisions for accessing the wireless local area network from the access point.

20 Claims, 8 Drawing Sheets

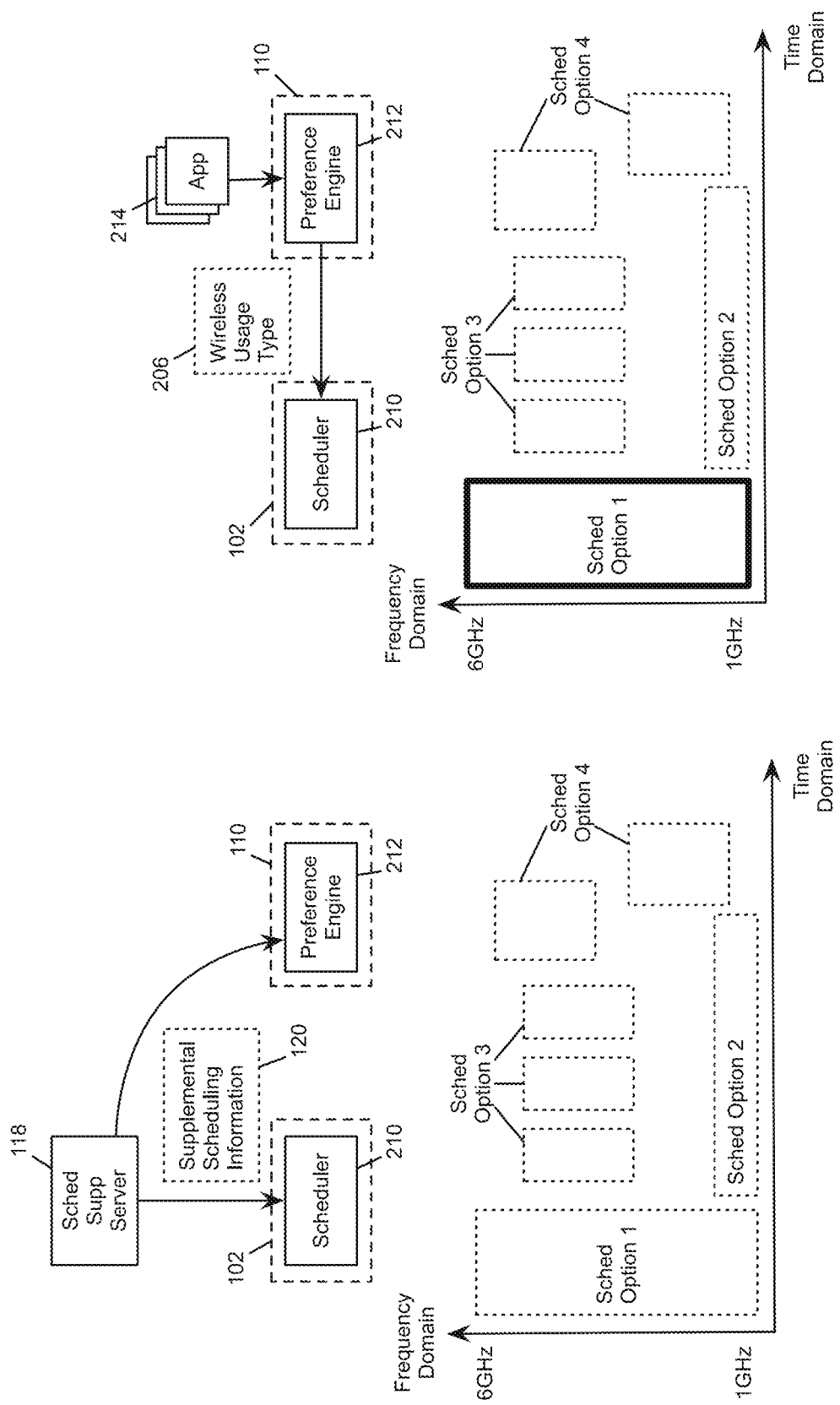

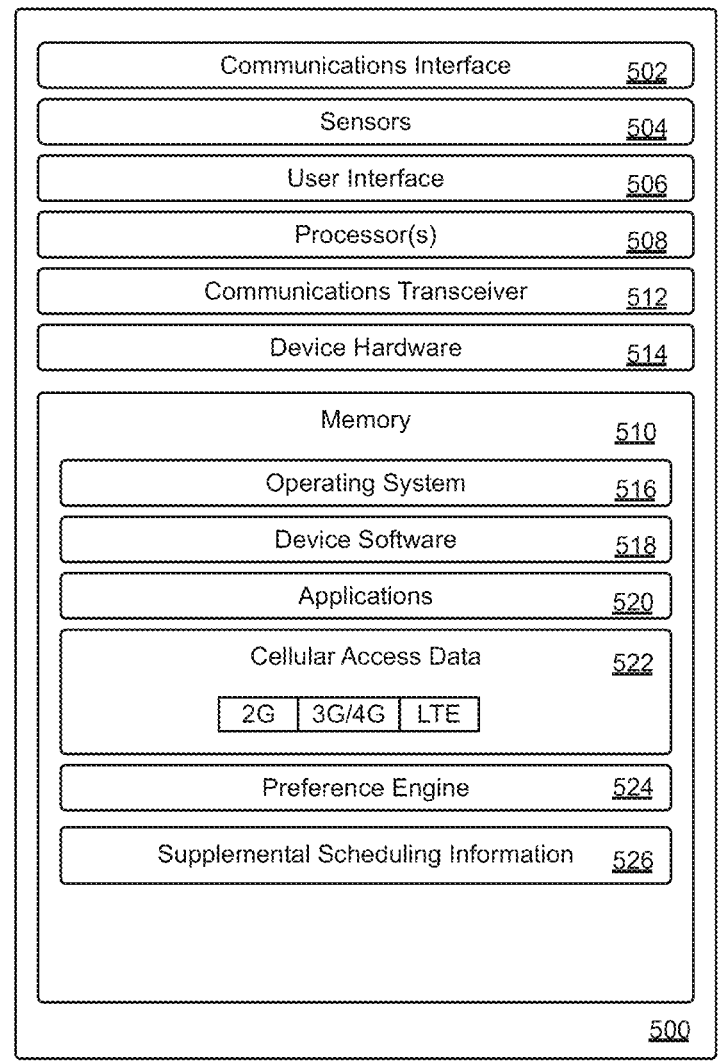
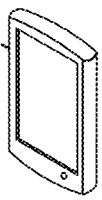
FIG. 5

US 10,750,523 B1

SUPPLEMENTAL SCHEDULING SERVER

BACKGROUND

Orthogonal Frequency-Division Multiple Access (OFDMA) is a multi-user version of the popular orthogonal frequency-division multiplexing (OFDM) digital modulation scheme. Multiple access is achieved in OFDMA by assigning subsets of subcarriers to individual users. OFDMA divides the radio spectrum into time-frequency Resource Units (RUs). A coordinating entity such as an Access Point (AP) assigns RUs to associated stations or equipment for reception or transmission.

802.11ax is a type of wireless local area network (WLAN) in the IEEE 802.11 family of WLANs. IEEE 802.11ax is designed to operate in existing spectrums assigned to WLANs. Unlike legacy WLANs (e.g. 802.11ac and prior) which use OFDM to allocate an entire frequency spectrum to a client station or equipment during each time slice (i.e., time division), 802.11ax uses OFDMA. OFDMA allocates different parts of the frequency spectrum to different users during each time slice. An AP implementing 802.11ax uses a scheduler to assign different time-frequency divisions (i.e., RUs) to different client stations or equipment.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 3 conceptually illustrates a user device and an access point using the supplemental scheduling information to facilitate the scheduling of an allocation of time-frequency divisions.

FIG. 4 conceptually illustrates the user device generating a request having a wireless usage type that is determined based on the supplemental scheduling information.

FIG. 5 is a block diagram showing various components of an example user device that uses the supplemental scheduling information when requesting for WLAN access.

DETAILED DESCRIPTION

This disclosure is directed to techniques that facilitate allocation of time-frequency divisions of WLAN for multiple users. A WLAN access point of a data network operates a scheduler that schedules time-frequency divisions for multiple user devices to access the data network through the WLAN. The data network provides a scheduling server, which collects telemetry data from multiple different access points. The collected telemetry data is used to generate a set of supplemental scheduling information. The generated supplemental scheduling information is provided to the user devices and the access points to facilitate the scheduling of time-frequency divisions.

Figure 1:
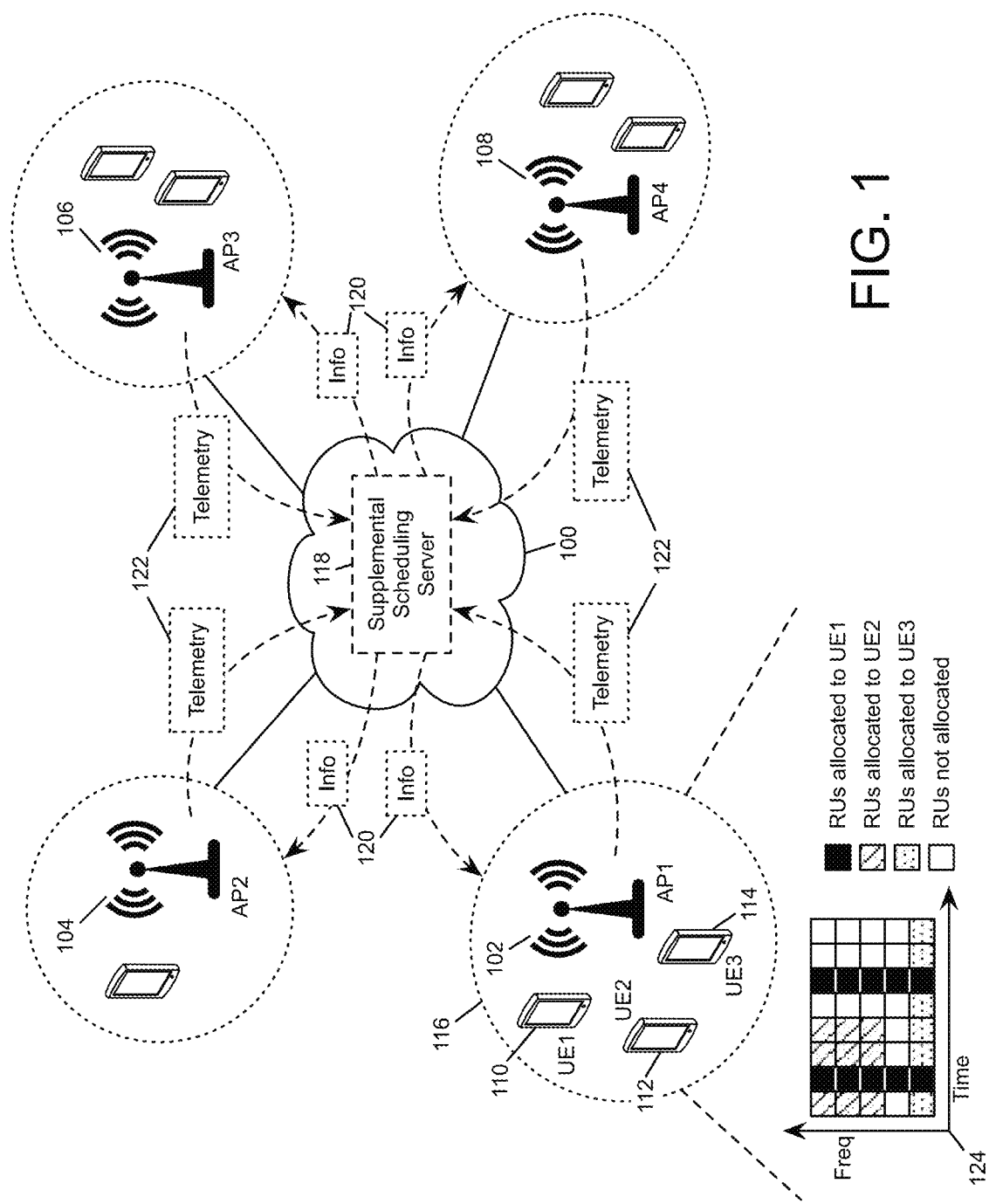
FIG. 1 illustrates a data network that collects telemetry data from WLAN access points and provides information derived from the collected telemetry data for scheduling time-frequency divisions.

FIG. 1 illustrates a data network 100 that collects telemetry data from WLAN access points and provides information derived from the collected telemetry data for scheduling time-frequency divisions. The data network 100 allows access for user devices through access points 102 (AP1), 104 (AP2), 106 (AP3), and 108 (AP4). In particular, the access point 102 provides WLAN access to user devices 110 (UE1), 112 (UE2), and 114 (UE3).

The data network 100 may be a network that is managed by an Internet Service Provider (ISP). The ISP manages the operations of the network, configures and monitors the network's physical components (e.g., routers, switches), instruments data traffic, and gathers telemetry data from the physical components throughout the network. The data network 100 may be part of a cellular network that is managed by the cellular service provider. In some embodiments, the managed network is a self-organized network (SON) implementing a collection of functions for automatic configuration, optimization, diagnosis, and healing of cellular networks.

Each of the user devices 110, 112, and 114 may be a desktop computer, a laptop computer, tablet computer, a smartphone, a smartwatch, a personal digital assistant (PDA), or any other computing device or mobile device that is capable of communicating with other devices via a network.

The access points 102, 104, 106, and 108 are WLAN access points that provide wireless access to the data network 100. The access point 102 in particular provides wireless access to multiple different user devices by allowing different user devices to access a WLAN 116 at different times (e.g., at different time divisions) or at different frequency bands (e.g., at different frequency divisions). The access point 102 may allocate different parts of the frequency spectrum of the WLAN 116 to different users during each time slice. In some embodiments, the access point 102 implements the WLAN 116 according to the 802.11ax standard. An access point implementing the 802.11ax standard may use a scheduler to allocate different time-frequency divisions (referred to as Resource Units or RUs in 802.11ax) to different client stations or equipment. FIG. 1 also illustrates a time-frequency division chart 124 that shows the frequency-time divisions of the WLAN 116 being allocated to different user devices. Specifically, the time-frequency division chart 124 shows an allocation of time-frequency divisions for the user device 110 (UE1), an allocation of time-frequency divisions for the user device 112 (UE2), and an allocation of time-frequency divisions for the user device 114 (UE3).

In order to assist in the task of allocating of time-frequency divisions to user devices, the data network 100 provides a supplemental scheduling server 118 that generates a set of supplemental scheduling information 120 for use by user devices and access points of the data network. The supplemental scheduling server 118 generates the supplemental scheduling information 120 from telemetry data 122 collected from the access points of the data network 100, including access points 102, 104, 106, and 108.

Telemetry data collected from an access point may include: the identities and/or user accounts associated with the user devices communicating with the access point; the amount and type of data uploaded and/or downloaded by each user device connected to the access point; the amount of time each user device is in connection with the access point; the signal strength received by each user device connected to the access point; the number of reconnections within a time interval by user devices connected to the access point; the amount of data flowing between the access point and the data network; the time-frequency divisions assigned to each user device; the number of user devices attempting to connect with the access point; the amount of data received over each frequency band; the number of packets through the access point to and from each user device; the source and destination IP addresses of the packets through the access point, etc.

Figure 2:
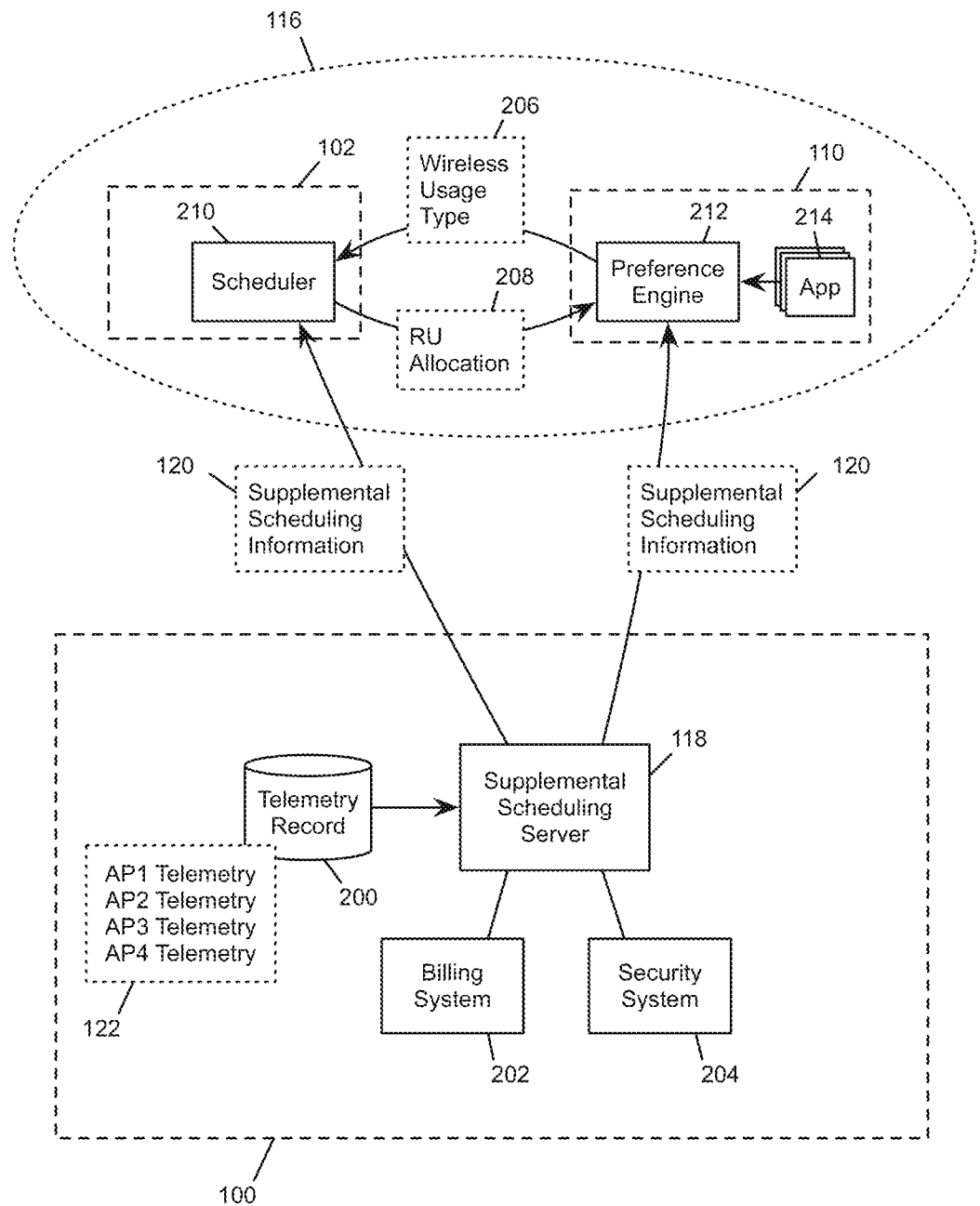
FIG. 2 illustrates the generation and the use of the supplemental scheduling information in the data network.

FIG. 2 conceptually illustrates the generation and the use of the supplemental scheduling information 120 in the data network 100. As illustrated, the supplemental scheduling server 118 has received telemetry data 122 from the access points AP1-AP4 (APs 102-108) and stores the collected telemetry data in a telemetry record 200. The supplemental scheduling server 118 includes a billing system 202 that uses the telemetry record 200 to generate billing information for user accounts associated with user devices accessing the data network. The supplemental scheduling server 118 also includes a security system 204 that uses the telemetry record 200 to detect security breaches. The supplemental scheduling server 118 may detect a security breach at a particular channel (frequency or time division) at an access point and inform the access point to block data communication at that particular channel.

The supplemental scheduling server 118 also uses the telemetry record 200 to generate the supplemental scheduling information 120. The supplemental scheduling information may include information of various access points and user devices, as well as up to date network conditions. Examples of information in the supplemental scheduling information include: load balancing information among various access points; numbers of user devices connected to various access points; signal strengths received by user devices connected to various access points; types of traffic running through the various access points and the data network; number of reconnections within a time interval by user devices connected to various access points; and the amount of bandwidth used by user devices connected to various access points. The supplemental scheduling information may also include interference and backhaul information in the data network.

The supplemental scheduling server 118 delivers the supplemental scheduling information 120 to the access point 102 through existing communications infrastructure between the core of the data network 100 and the access point 102. The supplemental scheduling server 118 delivers the supplemental scheduling information 120 to the user device 110 whenever the user device is communicatively connected to the data network 100 through any of the WLAN access points. The user device 110 and the access point 102 may receive the same set of supplemental scheduling information 120. The user device 110 and the access point 102 may also receive different sets of supplemental scheduling information 120 that are unique to the user device and the access point, respectively.

The access point 102 and the user device 110 use the supplemental scheduling information 120 to schedule an allocation of time-frequency divisions 208 (labeled as RU allocations) when the user device 110 requests the access point 102 for WLAN access. The user device 110 requests the access point 102 for WLAN access by providing a wireless usage type 206. The access point 102 operates a scheduler 210 that schedules the allocation of time-frequency divisions 208 for the user device 110 according to the wireless usage type 206. The user device 110 uses the supplemental scheduling information 120 to help set the wireless usage type 206. The access point 102 uses the supplemental scheduling information 120 to help determine whether to grant the request by the user device 110 based on the wireless usage type 206.

The user device 110 is configured to operate a preference engine 212 that determines the wireless usage type 206 based on the applications running on the user device 110. As illustrated, the user device is running one or more applications 214. The preference engine 212 determines the wireless usage type 206 based on the likely WLAN access profile of the application 214. The wireless usage type 206 corresponds to a preference for a type or class of allocations of time-frequency divisions. For example, the wireless usage type 206 may indicate a preference for time-frequency divisions at higher frequencies or time-frequency divisions at lower frequencies. The wireless usage type 206 may also indicate a preference for an allocation that includes the entire frequency spectrum within a time division. The wireless usage type 206 may also indicate a preference for time-frequency divisions in chunks (time-frequency divisions at different part of the frequency spectrum), time-frequency divisions in bursts (temporally consecutive time-frequency divisions), etc.

The spectrum that 802.11ax is designed to operate in ranges from 1 GHz to 6 GHz. Different parts of this spectrum have different characteristics, and the wireless usage type 206 selects the part of the spectrum that is most suitable for the applications running on the user device. For example, wireless signals at 1 GHz have better distance penetration but lower bandwidth than wireless signals at 6 GHz. An allocation of time-frequency divisions near 1 GHz would be more suitable for Internet of Things (IoT), in which equipment or stations using the WLAN are mostly low bandwidth equipment placed some distance away from the access point. On the other hand, wireless signals at 6 GHz have less penetration but better bandwidth than wireless signals at 1 GHz. An allocation of time-frequency divisions near 6 GHz would be more suitable for 4K video, which requires high data throughput.

When the user device 110 requests the access point 102 for access to the WLAN 116, the user device 110 determines the wireless usage type 206 based on the application running on the user device 110 as well as the supplemental scheduling information 120. The user device 110 uses the supplemental scheduling information 120 to learn what allocation schemes are likely available at the access point 102, while the access point 102 uses the supplemental scheduling information 120 to learn the information regarding the data network.

The preference engine 212 in the user device 110 negotiates with the scheduler 210 in the access point 102 based on the supplemental scheduling information 120 and based on a usage profile of the user device 110. The usage profile may include a preferred frequency range, preferred time division, preferred bandwidth requirement, etc. that are determined based on the applications running on the user device. For a WLAN that is capable of supporting 802.11ax, 802.11ac, and other legacy standards, the preference engine, based on the supplemental scheduling information 120 and the usage profile, may request to access the WLAN by 802.11ax, 802.11ac, or other legacy standards. If 802.11ax is selected, the preference engine 212 may determine a desired allocation of time-frequency divisions (e.g. use entire frequency spectrum, use chunks, use bursts, use a thin slice of the frequency spectrum, etc.) The preference engine 212 may also examine the supplemental scheduling information 120 and decide to conduct data traffic through a cellular network rather than through WLAN.

FIG. 3 conceptually illustrates the user device 110 and the access point 102 using the supplemental scheduling information 120 to facilitate the scheduling of an allocation of time-frequency divisions. In the example illustrated, the supplemental scheduling server 118 provides the supplemental scheduling information 120 to the scheduler 210 of the access point 102 and to the preference engine 212 of the user device 110. The scheduler 210 and the preference engine 212 in turn use the supplemental scheduling information 120 to identify four different example scheduling options 1-4 that are deemed available based on the collected telemetry data.

Scheduling option 1 is an allocation in which the user device is assigned the entire frequency spectrum of 802.11ax during a time division (in other words, OFDM or 802.11ac). Scheduling option 2 is an allocation that includes a burst of temporally consecutive time-frequency divisions within a thin slice of the frequency spectrum of 802.11ax along a lower frequency part of the spectrum. Scheduling option 3 is an allocation that includes several disjointed chunks of frequency and time divisions along a higher frequency part of the spectrum. Scheduling option 4 is an allocation that includes disjointed chunks of time-frequency divisions at different time and frequency ranges. These scheduling options are determined based on the telemetry data collected by the supplemental scheduling server 118. The scheduler 210 is constrained to schedule allocations of time-frequency divisions that fit into one of the scheduling options, while the preference engine 212 is constrained to only request allocations of time-frequency divisions that fit into one of the scheduling options.

FIG. 4 conceptually illustrates the user device 110 generating a request with a wireless usage type that is determined based on the supplemental scheduling information 120. The preference engine 212 is notified of the available scheduling options by the supplemental scheduling information 120. The preference engine 212 then determines the wireless usage type 206 by selecting a scheduling option that satisfies the WLAN bandwidth requirement of the application(s) 214 running on the user device 110. In the example, the preference engine 212 generates a wireless usage type 206 that corresponds to scheduling option 1. In some embodiments, when there are multiple access points available to the user device for WLAN access, the user device may use the supplemental scheduling information to identify an access point that is capable of supporting the wireless usage type.

Though not illustrated, the scheduler 210 may or may not grant the WLAN access request based on the wireless usage type 206, since the supplemental scheduling information 120 may not reflect the current status of the access point 102. If the scheduler 210 does not grant the user device 110 the requested wireless usage type 206, the preference engine 212 may identify a less preferred scheduling option as the wireless usage type and request the access point 102 again. However, the use of the supplemental scheduling information accelerates the negotiation process by constraining the scheduler and the preference engine to scheduling options that are likely to be acceptable to the user device, the access point, and the data network.

The scheduler 210 maps the wireless usage type 206 received from the preference engine 212 into a bandwidth profile in order to schedule an allocation of time-frequency divisions. These allocations of time-frequency divisions may be time-divisions in which the entire WLAN spectrum is dedicated to the user device (i.e., 802.11ac or OFDM). The allocation of time-frequency divisions may be limited to a particular frequency band (e.g. 1 GHz for IoT or 6 GHz for 4K video). The allocation of time-frequency divisions may be limited to a hyper subdivided frequency band. The allocation of time-frequency divisions may be distributed among different frequency bands at different time divisions.

FIG. 5 is a block diagram showing various components of an example user device 500 that uses the supplemental scheduling information when requesting WLAN access. The user device 500 is a user device in the data network 100 (e.g., the user devices 110, 112, and 114).

The user device 500 may include a communications interface 502, one or more sensors 504, a user interface 506, one or more processors 508, and memory 510. The communications interface 502 may include wireless and/or wired communication components that enable the user device 500 to transmit or receive voice or data communication over cellular networks and/or WiFi networks.

The sensors 504 may include a proximity sensor, a compass, an accelerometer, altimeter, cameras, and/or a global positioning system (GPS) sensor. The proximity sensor may detect movement of objects that are proximate to the user device 500. The compass, the accelerometer, and the GPS sensor may detect orientation, movement, and geolocation of the user device 500.

The user interface 506 may enable a user to provide inputs and receive outputs from the user device 500. The user interface 506 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 510 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The user device 500 may also include communications transceivers 512 and other device hardware 514. The communication transceivers are hardware components that enable the user device 500 to perform telecommunication and data communication with the multiple communication networks. The device hardware 514 may include other hardware that is typically located in a mobile telecommunication device. For example, the device hardware 514 may include signal converters, transceivers, antennas, hardware decoders and encoders, graphic processors, a SIM card slot, and/or the like that enable the user device 500 to execute applications and provide telecommunication and data communication functions. An integrated circuit chip such as a SIM may be inserted into the SIM card slot of the user device 500. Alternatively, an embedded SIM may be hardwired into the circuit board of the user device 500.

The one or more processors 508 and the memory 510 of the user device 500 may implement an operating system 516, device software 518, one or more applications 520, a set of cellular access data 522, and a preference engine 524. The memory 510 also stores a set of supplemental scheduling information 526.

The various software and applications may include routines, program instructions, objects, and/or data structures that perform particular tasks or implement particular abstract data types. The operating system 516 may include components that enable the user device 500 to receive and transmit data via various interfaces (e.g., user controls, communications interface 502, and/or memory input/output devices). The operating system 516 may also process data using the one or more processors 508 to generate outputs based on inputs that are received via the user interface 506. For example, the operating system 516 may provide an execution environment for the execution of the applications 520. The operating system 516 may include a presentation component that presents the output (e.g., display the data on an electronic display, store the data in memory, transmit the data to another electronic device, etc.).

The operating system 516 may include an interface layer that enables applications to interface with the communication transceivers 512 and/or the communications interface 502. The interface layer may comprise public APIs, private APIs, or a combination of both public APIs and private APIs. Additionally, the operating system 516 may include other components that perform various other functions generally associated with an operating system.

The device software 518 may include software components that enable the user device 500 to perform functions. For example, the device software 518 may include basic input/output system (BIOS), Boot ROM, or a bootloader that boots up the user device 500 and executes the operating system 516 following power up of the device.

The applications 520 may include applications that provide utility, entertainment, and/or productivity functionalities to a user of the user device 500. For example, the applications 520 may include electronic mail applications, remote desktop applications, web browser applications, navigation applications, office productivity applications, multimedia streaming applications, and/or so forth. The cellular access data 522 may store credentials for accessing 2G, 3G, 4G, 5G, or Long-Term Evolution (LTE) networks.

The preference engine 524 is a program component that includes instructions for negotiating with the access point for scheduling an allocation of time-frequency divisions. The preference engine 524 receives a status regarding the execution of the applications 520 to determine a usage profile.

The supplemental scheduling information 526 is information received from the supplemental scheduling server 118 through the communications interface 502. The supplemental scheduling information 526 is derived from telemetry data collected from various access points of a data network.

The preference engine 524 processes the supplemental scheduling information 526, which informs the preference engine 524 what scheduling options (e.g., time-frequency divisions allocation schemes) are likely available for accessing the WLAN. Based on the supplemental scheduling information and the usage profile, the preference engine 524 sets a wireless usage type and requests the access point for an allocation of time-frequency divisions based on the wireless usage type.

Figure 6:
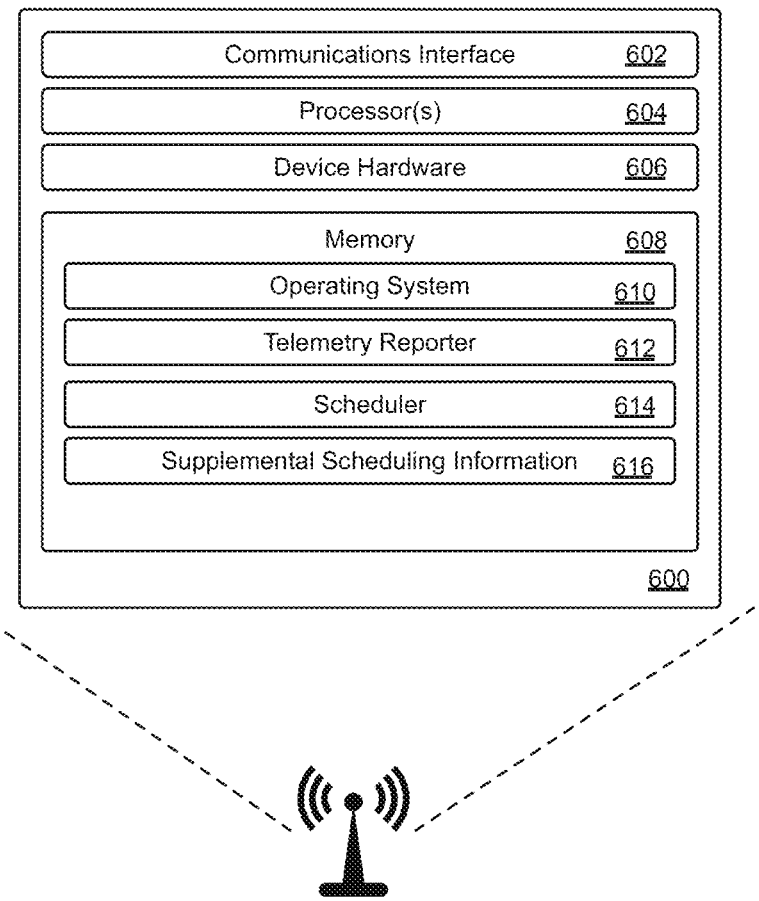
FIG. 6 is a block diagram showing various components of an access point that schedules allocations of time-frequency divisions to one or more user devices based on supplemental scheduling information.

FIG. 6 is a block diagram showing various components of an access point that schedules allocations of time-frequency divisions to one or more user devices based on supplemental scheduling information. The figure illustrates an access point 600 implementing an access point, such as the access point 102. The access point 600 may be a computer or an electronic device that is capable of receiving inputs, processing the inputs, and generating output data. The access point 600 may also be a virtual computing device such as a virtual machine or a software container that is hosted in a cloud.

The access point 600 may be equipped with one or more of the following: a communications interface 602, one or more processors 604, device hardware 606, and memory 608. The communications interface 602 may include wireless and/or wired communication components that enable the computing devices to transmit data to and receive data from other devices. The data may be relayed through a dedicated wired connection or via a communications network. The device hardware 606 may include additional hardware that performs user interface, data display, data communication, data storage, and/or other server functions. For example, the device hardware 606 may include an antenna, digital signal processors, radio transceivers, hardware data decoders and encoders, a network interface controller, etc.

The memory 608 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 604 and the memory 608 of the access point 600 may implement an operating system 610, a telemetry reporter 612, and a scheduler 614. The memory 608 also stores a set of supplemental scheduling information 616.

The operating system 610 may include components that enable the computing device 600 to receive and transmit data via various interfaces (e.g., user controls, communications interface, and/or memory input/output devices), as well as process data using the processors 604 to generate output.

The operating system 610 may include a presentation component that presents the output (e.g., display the data on an electronic display, store the data in memory, transmit the data to another electronic device, etc.). The operating system 610 may include a hypervisor that allows the computing device to operate one or more virtual machines and/or virtual network components. Additionally, the operating system 610 may include other components that perform various additional functions generally associated with an operating system.

The telemetry reporter 612 refers to one or more software components that instruments the access point by monitoring device hardware 606 and various software components of the access point 600. The telemetry reporter 612 reports the monitored data as telemetry or instrumentation data of the access point to the supplemental scheduling server in the data network.

The scheduler 614 is a program that schedules allocations of time-frequency divisions to one or more user devices. The supplemental scheduling information 616 is received from the supplemental scheduling server 118 through the communications interface 602. The supplemental scheduling information 616 is derived from telemetry data collected from various access points of the data network. The scheduler 614 uses the supplemental scheduling information 616 to determine whether to grant a request for access by a user device.

Figure 7:
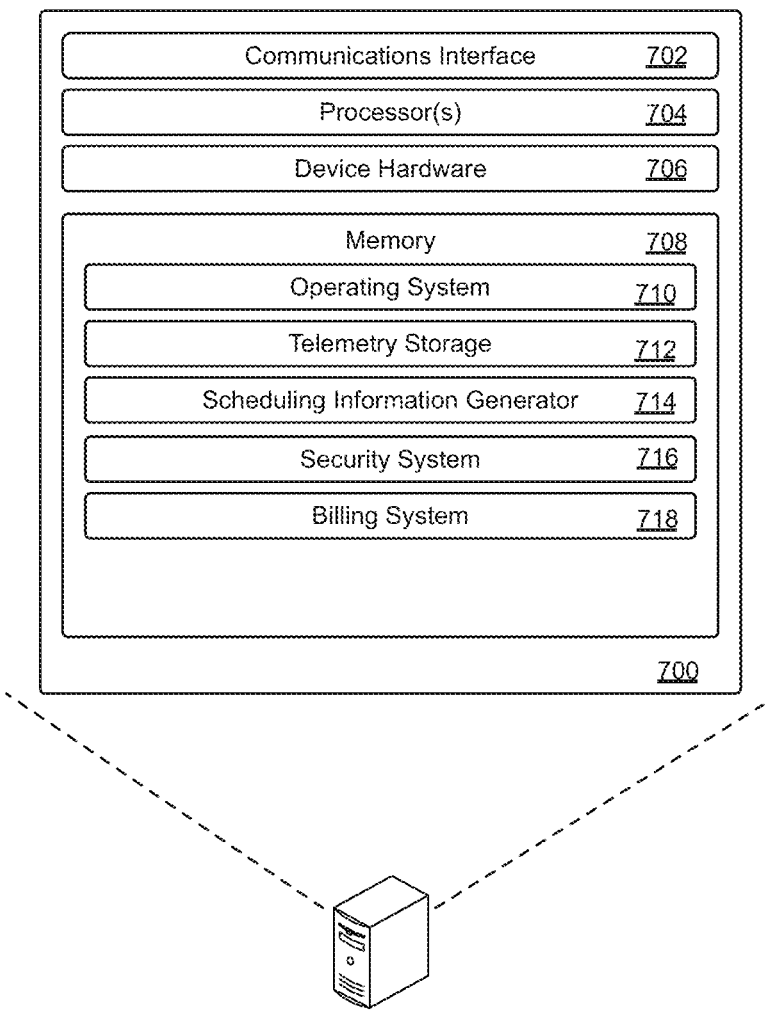
FIG. 7 is a block diagram showing various components of an example supplemental scheduling server that collects telemetry data from access points of a data network and provides the collected telemetry data as supplemental scheduling information to user devices and access points of the data network.

FIG. 7 is a block diagram showing various components of an example supplemental scheduling server that collects telemetry data from access points of a data network and provides the collected telemetry data as supplemental scheduling information to user devices and access points of the data network. The figure illustrates a computing device 700 implementing the supplemental scheduling server 118. The access point computing device 700 may be a general-purpose computer, such as a desktop computer, tablet computer, laptop computer, server, or an electronic device that is capable of receiving inputs, processing the inputs, and generating output data. The computing device 700 may also be a virtual computing device such as a virtual machine or a software container that is hosted in a cloud.

The computing device 700 may be equipped with one or more of the following: a communications interface 702, one or more processors 704, device hardware 706, and memory 708. The communications interface 702 may include wireless and/or wired communication components that enable the computing devices to transmit data to and receive data from other devices. The data may be relayed through a dedicated wired connection or via a communications network. The device hardware 706 may include additional hardware that performs user interface, data display, data communication, data storage, and/or other server functions.

The memory 708 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 704 and the memory 708 of the computing device 700 may implement an operating system 710, a telemetry storage 712, a scheduling information generator 714, a security system 716, and a billing system 718.

The operating system 710 may include components that enable the computing device 700 to receive and transmit data via various interfaces (e.g., user controls, communications interface, and/or memory input/output devices), as well as process data using the processors 704 to generate output. The operating system 710 may include a presentation component that presents the output (e.g., display the data on an electronic display, store the data in memory, transmit the data to another electronic device, etc.). The operating system 710 may include a hypervisor that allows the computing device to operate one or more virtual machines and/or virtual network components. Additionally, the operating system 710 may include other components that perform various additional functions generally associated with an operating system.

The telemetry storage 712 is a storage for telemetry data received from different access points of the data network. The telemetry data is received through the communications interface 702 and stored in the memory 708. The telemetry storage 712 may be organized as a circular buffer that continuously accepts updated telemetry data.

The scheduling information generator 714 is program that compiles the telemetry data stored in the telemetry storage 712 into supplemental scheduling information. In some embodiments, the scheduling information generator 714 generates the same set of data for all recipients. In some embodiments, the scheduling information generator 714 generates different sets of data for different recipients. For example, the supplemental scheduling information compiled for access points may have different types of information than supplemental scheduling information compiled for user devices. In some embodiments, the scheduling information generator 714 analyzes the collected telemetry data and identifies (i) a number of user devices connected to the data network, (ii) an amount of backhaul in the data network, and (iii) a level of interference between the user devices connected to the data network. The information identified from the telemetry data are included in the generated supplemental scheduling information The security system 716 is a program that uses the telemetry data stored in the telemetry storage 712 to detect security breaches. For example, the telemetry data collected from an access point may include records of source and destination IP addresses of packets going through the access point, as well as statistics of data being carried by different frequency bands. The supplemental scheduling server may detect a security breach by examining the telemetry data for an abnormal amount of data being carried by a particular frequency band or an abnormal amount of packet traffic being sent to a suspicious IP address. For example, an abnormal amount may mean an amount that is higher or lower than an average amount experienced over a comparable historical period of time. The supplemental scheduling server may inform the access point to block data communication at that particular frequency band, to shut down packet traffic to and from the suspicious IP address, or to block a user device from communicating through the access point.

The billing system 718 is a program that uses the telemetry data stored in the telemetry storage 712 to generate billing information for user accounts of the data network. For example, the telemetry data collected from the access points may include account information associated with different user devices, along with statistics regarding the amount of data received and sent by the different user devices at different access points. Based on this information, the billing system 718 may calculate the amount of data used by each user account and determine billing accordingly. The billing system may also charge different rates for different types of time-frequency divisions allocations. For example, the billing system may charge more for allocations that assign the entire spectrum to one user device (e.g., 802.11ac) and charge less for allocations that assign different parts of the frequency spectrum to different user devices.

Figure 8:
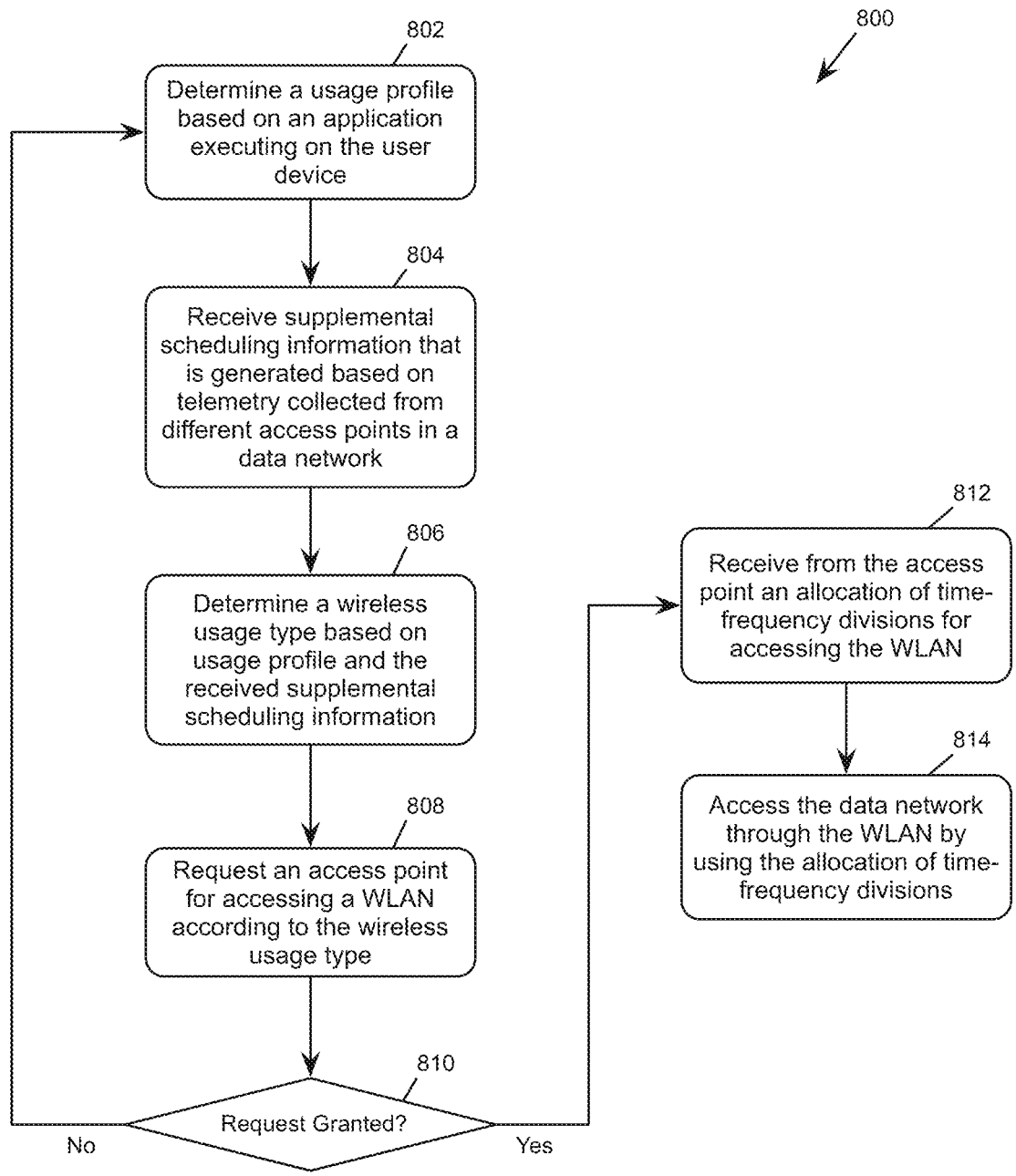
FIG. 8 conceptually illustrates a flow diagram of an example process for using supplemental scheduling information to negotiate with an access point for WLAN access.

FIG. 8 conceptually illustrates a flow diagram of an example process 800 for using supplemental scheduling information to negotiate with an access point for WLAN access. The process is performed by a user device such as the user device 500 or the user device 110.

The process 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 802, the user device determines a usage profile based on one or more applications executing on the user device. The usage profile indicates a bandwidth requirement and frequency range preference of the user device when the user device is using a WLAN to communicate with a data network while executing the applications. At block 804, the user device receives supplemental scheduling information that is generated based on telemetry data collected from one or more access points of the data network.

At block 806, the user device determines a wireless usage type based on the usage profile and the received supplemental scheduling information. The supplemental scheduling information informs the user device what scheduling options (e.g., time-frequency divisions allocation schemes) are likely available for accessing the WLAN at various access points. The user device selects one of the scheduling options that satisfies the usage profile as the wireless usage type. For example, the wireless usage type may correspond to a preference for a type or class of allocations of time-frequency divisions, e.g., a preference for time-frequency divisions at a particular frequency range, a preference for an allocation that includes the entire frequency spectrum within a time division (e.g., 802.11ac), a preference for time-frequency divisions in chunks, a preference for time-frequency divisions in bursts, etc.

At block 808, the user device requests an access point for accessing the WLAN according to the wireless usage type, i.e., requesting the access point to schedule an allocation of time-frequency divisions that satisfies the wireless usage type. In some embodiments, when there are multiple access points available to the user device for WLAN access, the user device may use the supplemental scheduling information to identify an access point that is capable of supporting the wireless usage type.

At block 810, the user device determines whether the access point has granted the request. If so, the process proceeds to block 812. Otherwise, the process returns to block 802 or 808 to generate another request for WLAN access. The new request may be for another access point or for a less preferred wireless usage type. In some embodiments, after a certain number of failed requests to the access point, the user device times out and makes no further request to the access point until a condition for renewed request is met.

At block 812, the user device receives from the access point an allocation of time-frequency divisions for accessing the WLAN. At block 814, the user device accesses the data network through the WLAN using the allocation of time-frequency divisions.

Figure 9:
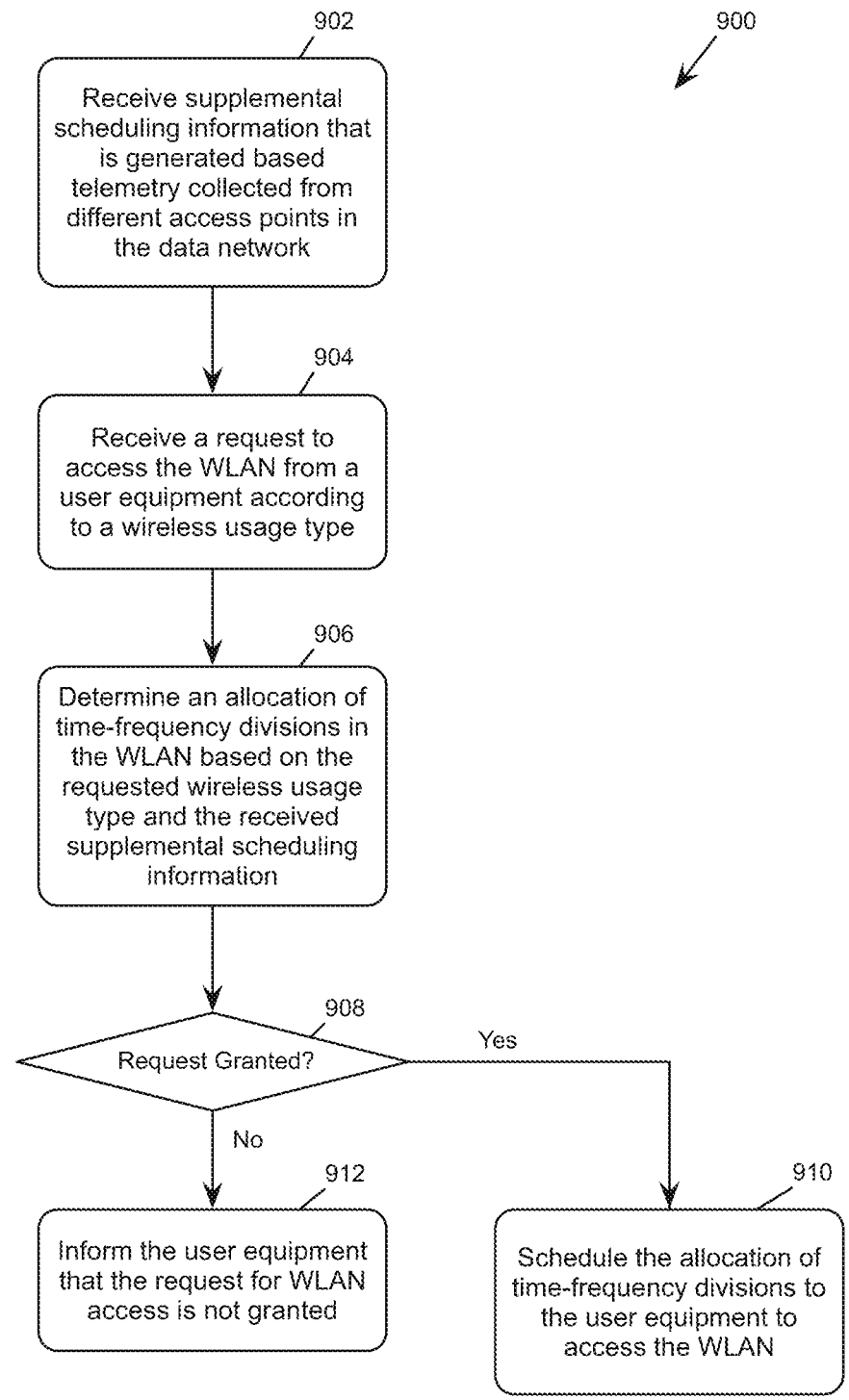
FIG. 9 conceptually illustrates a flow diagram of an example process for using supplemental scheduling information to schedule allocations of time-frequency divisions to user devices for WLAN access.

FIG. 9 conceptually illustrates a flow diagram of an example process 900 for using supplemental scheduling information to schedule allocations of time-frequency divisions to user devices for WLAN access. The process 900 is performed by an access point such as the access point 600 or the access point 102.

The process 900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 902, the access point receives supplemental scheduling information from a supplemental scheduling server. The information is generated based on telemetry data collected from different access points in the data network.

At block 904, the access point receives a request to access the WLAN from a user device according to a wireless usage type. At block 906, the access point determines an allocation of time-frequency divisions in the WLAN based on the requested wireless usage type and the received supplemental scheduling information. In some embodiments, the access point uses the received supplemental scheduling information to identify different scheduling options that are deemed available based on the collected telemetry data and to constrain the allocations of time-frequency divisions according to one of the scheduling options.

At block 908, the access point determines whether to grant the request for WLAN access based on whether the access point is able to schedule the allocation of time-frequency divisions. The access point cannot grant the access request if the necessary time-frequency divisions of the WLAN are already scheduled for other user devices, or if the requested wireless usage is not one of the scheduling options permitted by the supplemental scheduling information. If the access point is able to schedule the allocation of time-frequency divisions, the process proceeds to block 910. If the access point is not able to schedule the allocation of time-frequency divisions, the process proceeds to block 912.

At block 910, the access point schedules the allocation of time-frequency divisions for the user device to access the WLAN, and informs the user device that the request has been granted. At block 912, the access point does not schedule the allocation of time-frequency divisions and informs the user device that the request is not granted.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user device comprising:
   one or more processors; and
   a computer-readable medium storing a plurality of computer-executable components that are executable by the one or more processors to perform a plurality of actions, the plurality of actions comprising:
   receiving supplemental scheduling information, the supplemental scheduling information being generated based on telemetry data collected from a plurality of access points of a data network;
   requesting an access point of the data network for accessing a wireless local area network according to a wireless usage type, the wireless usage type based on an application running on the user device and the supplemental scheduling information; and
   receiving an allocation of time-frequency divisions for accessing the wireless local area network from the access point.

2. The user device of claim 1, wherein a scheduling server of the data network generates the supplemental scheduling information based on the collected telemetry data and provides the supplemental scheduling information to the access point and the user device.

3. The user device of claim 1, wherein determining the wireless usage type comprises identifying a set of scheduling options based on the supplemental scheduling information and constraining the wireless usage type to one of the scheduling options.

4. The user device of claim 1, wherein requesting the access point comprises identifying an access point that is capable of supporting the wireless usage type based on the supplemental scheduling information.

5. The user device of claim 1, where the supplemental scheduling information comprises at least one of:
   load balancing information among the plurality of access points;
   a number of user devices connected to the plurality of access points;
   signal strengths received by user devices connected to the plurality of access points;
   types of traffic running through the plurality of access points;
   a number of reconnections within a time interval by user devices connected to the plurality of access points; and
   an amount of bandwidth used by user devices connected to the plurality of access points.

6. The user device of claim 1, wherein the wireless usage type indicates a preference for a burst of temporally consecutive time-frequency divisions that are allocated to the user device.

7. The user device of claim 1, wherein the wireless usage type indicates a preference for a time division that is allocated to the user device and no other user devices.

8. The user device of claim 1, wherein the wireless usage type indicates a preference for a particular frequency band.

9. A computing device implementing an access point of a wireless local area network, comprising:
   one or more processors; and
   a computer-readable medium storing a plurality of computer-executable components that are executable by the one or more processors to perform a plurality of actions, the plurality of actions comprising:
   receiving supplemental scheduling information, the supplemental scheduling information being generated based on telemetry data collected from a plurality of access points in a data network;
   receiving a request from a user device to access the wireless local area network according to a wireless usage type; and
   scheduling an allocation of time-frequency divisions based on the wireless usage type and the received supplemental scheduling information; and
   providing the user device with access to the wireless local area network according to the scheduled allocation of time-frequency divisions.

10. The computing device of claim 9, wherein a scheduling server of the data network generates the supplemental scheduling information based on the collected telemetry data and provides the generated supplemental scheduling information to the access point and the user device.

11. The computing device of claim 9, wherein scheduling the allocation of time-frequency divisions comprises identifying a set of scheduling options based on the supplemental scheduling information and constraining the allocations of time-frequency divisions according to one of the scheduling options.

12. The computing device of claim 9, wherein the allocation of time-frequency divisions comprises a time division that is allocated to the user device and no other user device.

13. The computing device of claim 9, wherein the allocation of time-frequency divisions comprises a time division in which different frequency divisions are allocated to different user devices.

14. The computing device of claim 9, wherein the supplemental scheduling information comprises at least one of:
   load balancing information among the plurality of access points;
   a number of user devices connected to the plurality of access points;
   signal strengths received by user devices connected to the plurality of access points;
   types of traffic running through the plurality of access points;
   a number of reconnections within a time interval by user devices connected to the plurality of access points; and
   an amount of bandwidth used by user devices connected to the plurality of access points.

15. The computing device of claim 9, wherein the supplemental scheduling information comprises interference and backhaul information in the data network.

16. A computing device comprising:
   one or more processors; and
   a computer-readable medium storing a plurality of computer-executable components that are executable by the one or more processors to perform a plurality of actions, the plurality of actions comprising:

receiving telemetry data from a plurality of access points of a data network;

generating, based on the received telemetry data, a set of supplemental scheduling information;

providing the supplemental scheduling information to a set of user devices, wherein a user device uses the supplemental scheduling information to request an access point of a wireless local area network for a wireless usage type based on an application running on the user device and the supplemental scheduling information; and providing the supplemental scheduling information to a set of access points, wherein the access point uses the supplemental scheduling information to allocate time-frequency divisions to the user device based on the wireless usage type.

17. The computing device of claim 16, further comprising using the received telemetry data to generate billing information for a user of the user device.

18. The computing device of claim 16, further comprising using the received telemetry data to detect security breaches.

19. The computing device of claim 16, further comprising using the received telemetry data to detect a security breach at a time-frequency division at the access point and to inform the access point to block data communication at the time-frequency division.

20. The computing device of claim 16, wherein generating the supplemental scheduling information comprises determining (i) a number of user devices connected to the data network, (ii) an amount of backhaul in the data network, and (iii) a level of interference between the user devices connected to the data network from the received telemetry data.

* * * * *